United States Patent
Piekarski

(10) Patent No.: US 9,880,954 B2
(45) Date of Patent: Jan. 30, 2018

(54) METHOD AND APPARATUS FOR PROVIDING DATA ACCESS

(75) Inventor: Marek Piekarski, Cheshire (GB)

(73) Assignee: Micron Technology, Inc., Boise, ID (US)

( * ) Notice: Subject to any disclaimer, the term of this patent is extended or adjusted under 35 U.S.C. 154(b) by 1176 days.

(21) Appl. No.: 12/328,381

(22) Filed: Dec. 4, 2008

(65) Prior Publication Data

US 2010/0146160 A1  Jun. 10, 2010

(30) Foreign Application Priority Data

Dec. 1, 2008  (GB) .................................. 0821886.9

(51) Int. Cl.
*G06F 13/28*  (2006.01)

(52) U.S. Cl.
CPC .................................. *G06F 13/28* (2013.01)

(58) Field of Classification Search
None
See application file for complete search history.

(56) References Cited

U.S. PATENT DOCUMENTS

| | | | |
|---|---|---|---|
| 5,361,389 A * | 11/1994 | Fitch ............................... | 703/27 |
| 5,832,246 A | 11/1998 | Matsumoto | |
| 6,105,160 A | 8/2000 | Fukumoto et al. | |
| 6,804,759 B2 * | 10/2004 | Luick ............................ | 711/169 |
| 6,839,892 B2 * | 1/2005 | Dawkins et al. ............. | 717/124 |
| 7,095,747 B2 * | 8/2006 | Sarmiento et al. ........... | 370/401 |
| 7,171,495 B2 | 1/2007 | Matters et al. | |
| 7,243,229 B2 * | 7/2007 | Maki et al. .................... | 713/164 |
| 7,281,062 B1 * | 10/2007 | Kuik ..................... | G06F 13/385 |
| | | | 370/395.52 |
| 7,403,542 B1 * | 7/2008 | Thompson ..................... | 370/474 |
| 7,567,620 B2 * | 7/2009 | Rozental ....................... | 375/260 |
| 7,660,306 B1 * | 2/2010 | Eiriksson ............ | H04L 12/4641 |
| | | | 370/392 |
| 7,752,376 B1 * | 7/2010 | Johnsen et al. ............... | 710/311 |
| 2002/0156612 A1 * | 10/2002 | Schulter et al. ................ | 703/23 |
| 2003/0039215 A1 * | 2/2003 | Eatough et al. .............. | 370/254 |
| 2003/0126322 A1 * | 7/2003 | Micalizzi et al. ............. | 710/52 |
| 2003/0208631 A1 | 11/2003 | Matters et al. | |
| 2004/0073738 A1 * | 4/2004 | Kessler et al. ................ | 710/308 |

(Continued)

FOREIGN PATENT DOCUMENTS

| | | |
|---|---|---|
| EP | 0 473 102 A2 | 3/1992 |
| EP | 0 473 102 A3 | 3/1992 |
| GB | 2 383 440 A | 6/2003 |

OTHER PUBLICATIONS http://www.vmware.com/technology/virtual-infrastructure.html. (2 pages), Date: Mar. 13, 2009.

(Continued)

*Primary Examiner* — Henry Tsai
*Assistant Examiner* — Christopher Bartels
(74) *Attorney, Agent, or Firm* — Barnes & Thornburg LLP

(57) ABSTRACT

A method of providing access to first data stored at a first device to a second device, the first device storing the first data in a memory accessible to said second device. The method comprises, at a control element distinct from each of said first and second devices accessing the stored first data in said memory accessible to said second device before said first data is accessed in said memory accessible to said second device by said second device.

53 Claims, 4 Drawing Sheets

(56) References Cited

U.S. PATENT DOCUMENTS

| | | | |
|---|---|---|---|
| 2004/0109447 A1 | 6/2004 | Douglass et al. | |
| 2004/0139237 A1* | 7/2004 | Rangan | G06F 3/0613 710/1 |
| 2004/0139295 A1* | 7/2004 | Arimilli et al. | 711/207 |
| 2005/0080982 A1 | 4/2005 | Vasilevsky et al. | |
| 2005/0220128 A1* | 10/2005 | Tucker et al. | 370/412 |
| 2005/0246453 A1* | 11/2005 | Erlingsson et al. | 710/1 |
| 2005/0286544 A1* | 12/2005 | Kitchin et al. | 370/412 |
| 2006/0013222 A1* | 1/2006 | Rangan et al. | 370/389 |
| 2006/0159115 A1* | 7/2006 | Haneda | G06F 11/0745 370/422 |
| 2006/0171303 A1 | 8/2006 | Kashyap | |
| 2006/0195663 A1* | 8/2006 | Arndt et al. | 711/153 |
| 2006/0239287 A1* | 10/2006 | Johnsen et al. | 370/412 |
| 2006/0251067 A1* | 11/2006 | DeSanti | H04L 29/12801 370/389 |
| 2007/0043531 A1* | 2/2007 | Kosche et al. | 702/182 |
| 2007/0185992 A1* | 8/2007 | Simpson | 709/225 |
| 2007/0186025 A1 | 8/2007 | Boyd et al. | |
| 2007/0283115 A1* | 12/2007 | Freeman et al. | 711/163 |
| 2008/0123559 A1* | 5/2008 | Haviv et al. | 370/255 |
| 2009/0198911 A1* | 8/2009 | Arimilli et al. | 711/141 |
| 2009/0279541 A1* | 11/2009 | Wong | H04L 41/0631 370/389 |

OTHER PUBLICATIONS http://delltechcenter.com/page/FlexAddress?t=anon (4 pages), Date: Mar. 13, 2009.
http://www.theregister.co.uk/2008/07/01/dell_flex_address_blade/ (2 pages), Date: Mar. 13, 2009.

\* cited by examiner

METHOD AND APPARATUS FOR PROVIDING DATA ACCESS

The present application claims priority, under 35 U.S.C. § 119(a), to United Kingdom National Application No. GB0821886.9, filed Dec. 1, 2008, which is hereby incorporated by reference herein.

The present invention relates to a method and apparatus for providing access to data stored at a first device to a second device, and a method and apparatus for providing data from a second device to the memory of a first device. The invention has particular, but not exclusive, applications in systems providing I/O devices with Direct Memory Access (DMA) to the memory of a computing device.

It is often necessary to send data between devices in a computer system, for example it is often necessary to connect a processing device to a plurality of input and output devices. Appropriate data communication is achieved by connecting the devices in such a way as to allow them to send data packets to each other over a physical link, which may be a wired link or a wireless link. The sending and receiving of data packets is often described in terms of transactions. A transaction involves one or more data packets being sent between devices.

It is known in the art to use a switch to route data packets from an output of one device to inputs of one or more other devices. Such a switch comprises one or more input ports arranged to allow the data packets to be received by the switch, and one or more output ports arranged to allow the data packets to be transmitted from the switch.

Many conventional computer systems do not share input/output (I/O) devices. That is, each computer has its own dedicated I/O devices. It is, however, advantageous to allow the sharing of I/O devices such that a plurality of computers can access one or more shared I/O devices. This allows an I/O device to appear to a computer system to be dedicated (i.e. local) to that computer system, while in reality it is shared between a plurality of computers.

Sharing of I/O devices can be implemented using what is known as I/O virtualization. I/O Virtualization allows physical resources (e.g. memory) associated with a particular I/O device to be shared by a plurality of computers. One advantage of I/O virtualization is that it allows an I/O device to appear to function as multiple devices, each of the multiple devices being associated with a particular computer.

Sharing of I/O devices can lead to better resource utilisation, scalability, ease of upgrade, and improved reliability. One application of I/O virtualization allows I/O devices on a single computer to be shared by multiple operating systems running concurrently on that computer. Another application of I/O virtualization, known as multi-root I/O virtualization, allows multiple independent computers to share a set of I/O devices. Such computers may be connected together by way of a computer network. Rack Mounted or Blade Server type computing platforms in particular, but not exclusively, can benefit from consolidation of I/O resources.

Multi-root I/O virtualization can be used to virtualize I/O devices such that computers connected to those I/O devices are provided with a virtualized representation of some or all of the I/O devices. By providing a virtualized view of I/O devices, a computer using those devices need not be concerned with which particular device it is currently using. This allows for the provision of features such as load balancing, failover and port/link aggregation.

Load balancing helps to improve resource utilisation by allowing a particular computer to share work between a plurality of I/O devices. By sharing work between a number of I/O devices, bottlenecks can be avoided and work can be performed more efficiently. Failover provides a computer with continued access to at least one of a plurality of I/O devices in the event that one or more of those I/O devices becomes unavailable. Port/link aggregation allows multiple, low-bandwidth I/O devices to be represented as a single high bandwidth I/O device to aggregate the bandwidth of individual network connections.

It is an object of an embodiment of the present invention to provide methods which allow I/O device virtualisation to be implemented.

According to a first aspect of the present invention, there is provided a method and apparatus for providing access to first data stored at a first device to a second device, the first device storing the first data in a memory accessible to the second device. The method comprises, at a control element distinct from each of the first and second devices: accessing the stored first data in the memory accessible to the second device before the first data is accessed in the memory accessible to the second device by the second device.

Thus, the control element may access the stored first data and modify its behaviour based upon the contents of the first stored data.

Accessing the stored first data in the memory accessible to the second device may further comprise modifying the stored first data in the memory accessible to the second device before the first data is accessed by the second device.

Thus, the control element referred to in some described embodiments as a virtualization proxy controller, may be arranged to modify stored data before it is accessed by the second device. In this way, the second device is able to access modified data. The modification is carried out without requiring any action on the part of the first or second devices. That is, the control element allows the modification to be carried out transparently.

The method may further comprise, at the control element: receiving a message from the first device and accessing and modifying the stored first data in response to receipt of the message. The message may be a command intended to initiate access by the second device to the memory accessible to the second device. The message may be directed from the first device to the second device and redirected to the control element at a switching device. That is, the modification of stored data may be carried out by the control element in response to a message directed to the second device which is redirected without such redirection being apparent to the first device. That is, the modification may be initiated without any specific action on the part of the first device.

The message may be contained within a data packet and the method may further comprise determining at the switching device whether a received data packet satisfies a predetermined criterion, and forwarding the data packet to the control element if but only if it is determined that the data packet satisfies the predetermined criterion.

The predetermined criterion may be based upon a type of transaction with which the data packet is associated. The predetermined criterion may be that the data packet comprises a command. The method may further comprise, if it is determined that the data packet does not satisfy the predetermined criterion, forwarding the data packet from the switching device to the second device.

The message may comprise data indicating the stored first data to be accessed and modified. The data indicating the stored data to be accessed and modified may comprise data indicating further data stored at the first device, the further data indicating the stored first data to be accessed and modified.

The method may further comprise copying the further data to a memory accessible by and local to the control element. For example a memory provided at the control element or at the switching device.

The stored first data may comprise data defined with reference to the first device, and the modifying may modify the data defined with reference to the first device to be defined with reference to the second device. The data defined with reference to the first device may comprise an identifier used by the first device to reference the second device. The data defined with reference to the first device may be a logical identifier of the second device. Modifying the data defined with reference to the first device so as to be defined with reference to the second device may comprise modifying the data to indicate a physical identifier of the second device. The method may further comprise reading the data defined with reference to the first device; determining corresponding data defined with reference to the second device; and modifying the data defined with reference to the first device based upon the corresponding data.

The method may further comprise storing data in a memory accessible to the control element defining relationships between the data defined with reference to the first device and the data defined with reference to the second device.

The stored first data may comprise a plurality of data packets. The modifying may comprise modifying a field in a header of at least one of the plurality of data packets.

The modifying may comprise modifying a part of at least one of the plurality of data packets defined by an offset relative to a start of the data packet.

The method may further comprise, at the second device, reading data from the memory accessible to the second device after the modification.

The first device may be a computing device, the memory accessible to the second device may be a memory of the computing device and the second device may access the memory of the computing device using direct memory access. The second device may be an input/output (I/O) device.

According to a second aspect of the present invention, there is provided a control element comprising a memory storing processor readable instructions, and a processor arranged to read and execute instructions stored in the program memory. The processor readable instructions comprise instructions arranged to cause the processor to carry out a method as set out above. It will be appreciated that while in some embodiments the control element may be implemented as a programmable processor, that other implementations are possible.

The control element may be in communication with a switching device, and the switching device may comprise a first interface for communication with the first device, a second interface for communication with the second device, a third interface for communication with the control element, and a processor arranged to process data packets passing between the first device and the second device, and to forward a processed data packet to the control element if but only if a predetermined criterion defined with reference to the processed data packets is satisfied.

According to a third aspect of the present invention, there is provided a method of storing data in a memory of a first device, the memory being accessible to a second device, and the data being received from the second device the method comprising, at a control element distinct from each of the first and second devices: accessing the data in the memory accessible to the second device before the data is processed by the first device.

Accessing the data in the memory accessible to the second device may further comprise modifying the data in the memory accessible to the second device before the data is processed by the first device.

The method may further comprise, at the control element: receiving a message from the second device and accessing and modifying the data in response to receipt of the message. The message may be an interrupt indicating that the data has been written to the memory by the second device.

Thus, the control element is arranged to modify data provided to the first device by the second device before such data is processed by the first device. The modification is carried out without requiring any action of the part of the first or second devices.

The method may further comprise, at the control element: receiving an initiation message, the initiation message being generated by the first device and indicating a part of the memory accessible to the second device to which data is to be written by the second device. The data indicating a part of the memory accessible to the second device to which data is to be written may indicate further data stored at the first device, the further data indicating the part of the memory accessible to the second device to which data is to be written.

The method may further comprise copying the further data to a memory accessible by and local to the control element. For example a memory provided at the control element or at the switching device.

The second device may write data defined with reference to the second device, and the modifying may modify the data defined with reference to the second device to be defined with reference to the first device.

The data defined with reference to the first device may comprise an identifier used by the first device to reference the second device. The data defined with reference to the first device may be a logical identifier of the second device. Modifying the data defined with reference to the second device so as to be defined with reference to the first device may comprise modifying the data to indicate a logical identifier of the second device.

The method may further comprise: reading the data defined with reference to the second device, determining corresponding data defined with reference to the first device, and modifying the data defined with reference to the second device based upon the corresponding data.

The method may further comprise storing data in a memory accessible to the control element defining relationships between the data defined with reference to the first device and the data defined with reference to the second device.

According to a fourth aspect of the present invention, there is provided apparatus for storing data in a memory of a first device, the memory being accessible to a second device, and the data being received from the second device the apparatus comprising, a control element distinct from each of the first and second devices, the control element further comprising: means for accessing the data in the memory accessible to the second device before the data is processed by the first device.

It will be appreciated that features presented in the context of one aspect of the invention in this description can equally be applied to other aspects of the invention.

It will be appreciated that aspects of the present invention can be implemented in any convenient way including by way of suitable hardware and/or software. For example, a switching device arranged to implement embodiments of the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals. Methods for operating switching devices are also provided by the invention.

Embodiments of the present invention will now be described, by way of example, with reference to the accompanying drawings, in which.

Figure 1:
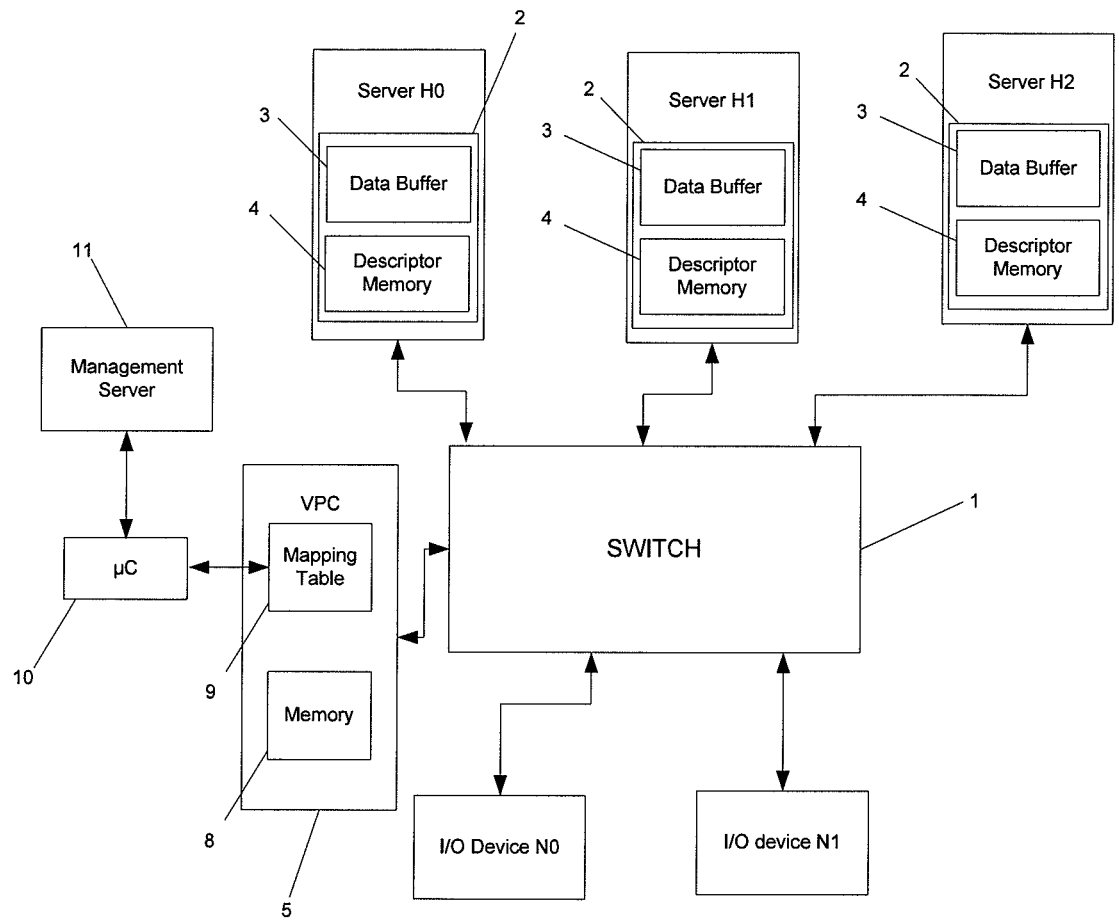
FIG. 1 is a schematic illustration of a plurality of servers connected to a plurality of I/O devices and a virtualization proxy controller (VPC) via a switch.

Referring first to FIG. 1, three servers H0, H1, H2 are connected to two input/output (I/O) devices N0, N1 by way of a switch 1. The switch 1 is arranged to direct data packets between the servers H0, H1, H2 and the I/O devices N0, N1. The I/O devices N0, N1 can take any suitable form, and can be, for example, network interface cards, storage devices, or graphics rendering devices. In a preferred embodiment the switch 1 is a PCI Express switch and the I/O devices and servers communicate with one another by exchanging PCI Express data packets.

The servers H0, H1, H2 each comprise a memory 2 partitioned to provide a data buffer area 3 and a descriptor area 4. Each I/O device N0, N1 is allocated a particular part of the data buffer area 3 and a particular part of the descriptor area 4 in the memory 2 of each of the servers H0, H1, H2 with which it is to communicate. Each I/O device may be allocated a contiguous part of the data buffer area 3 in the memory 2 of the relevant servers, or alternatively may be allocated a plurality of non-contiguous parts of the data buffer area 3 in the memory 2 of the relevant servers. Similarly, each I/O device may be allocated a single contiguous part or a plurality of non-contiguous parts of the descriptor area 4 of the memory 2 of the relevant servers.

The data buffer area 3 stores data packets which are to be sent to, or which have been received from, an I/O device N0, N1. The descriptor area 4 stores descriptors, each descriptor comprising an address in the data buffer area 3 at which a data packet is stored, the length and status of that data packet and, if applicable, a pointer to a next descriptor. Descriptors for multiple data packets may be linked to facilitate block transfers of data packets, and descriptors for sequential data packets may be stored in contiguous or non-contiguous memory locations in the descriptor area 4.

From the preceding description, it can be appreciated that the descriptor memory 4 allocated to a particular I/O device defines data packets which have been received from and/or data packets which are to be transmitted to that I/O device. The content of each data packet is stored in the appropriate part of the data buffer area 3.

To allow for effective and efficient data transfer between the servers H0, H1, H2 and the I/O devices N0, N1, the I/O devices N0, N1 are able to directly write data to and read data from the memory 2 of the servers H0, H1, H2 using what is referred to as Direct Memory Access (DMA). That is, the I/O devices N0, N1 are arranged to access the descriptor area 4 so as to locate relevant data packets in the data buffer area 3. The I/O devices N0, N1 are then able to access the data buffer area 3 to read the data which is to be transferred. Similarly, the I/O devices are able to access the data buffer area 3 to store data which is to be transferred to one of the servers H0, H1, H2 from one of the I/O devices, and also to update appropriate descriptors to the descriptor area 4.

The arrangement of FIG. 1 further comprises a virtualization proxy controller (VPC) 5. The virtualization proxy controller 5 may appear to the servers H0, H1, H2 as another I/O device, or alternatively may be invisible to both the servers and the I/O devices. The virtualization proxy controller 5 is arranged to provide various functionality which allows the I/O devices N0, N1 to be effectively shared by the servers H0, H1, H2 as is described in further detail below. Operation of the virtualization proxy controller is configured by a microcontroller 10 which receives commands from a management server 11. In this way an administrator can use the management server 11 to provide commands indicating how the virtualization proxy controller 5 should operate, and such commands are then provided to the virtualization proxy controller 5 by the microcontroller 10.

Figure 2:
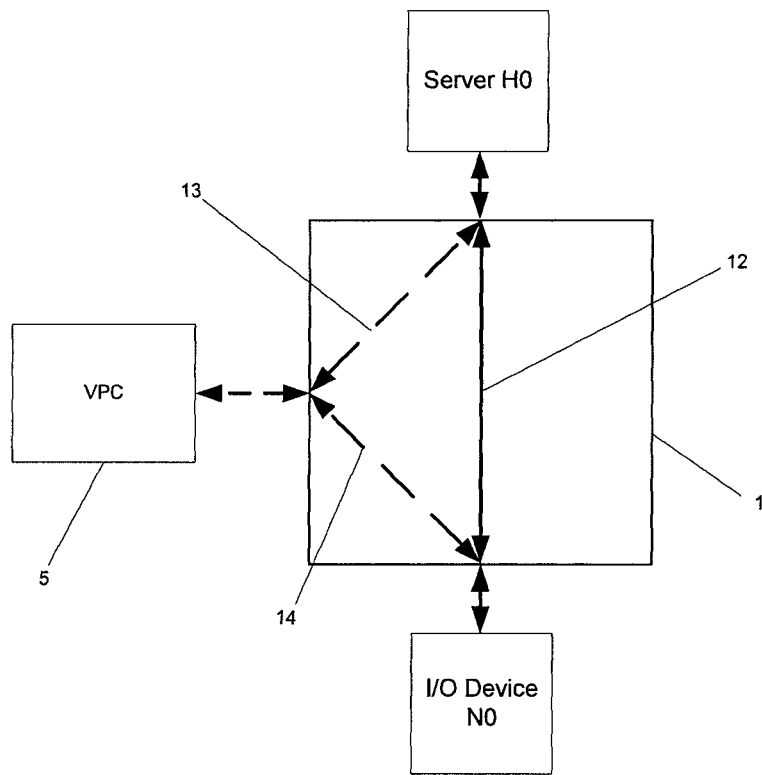
FIG. 2 is a schematic illustration of data flow between an I/O device and a server in the arrangement of FIG. 1.

As indicated above, the switch 1 is generally arranged to allow data packets to pass between the servers H0, H1, H2 and the I/O devices N0, N1. Switching is generally based upon an address included within a data packet processed by the switch. Referring to FIG. 2, the switch 1 is again shown, as are the server H0, the I/O device N0 and the virtualization proxy controller 5. A path 12 shows the route taken by data packets which are passed between the server H0 and the I/O device N0. Some data packets sent from the server H0 to the I/O device N0 are intercepted by the switch 1 and directed to the virtualization proxy controller 5 as indicated by a path 13 and similarly, some data packets sent from the I/O device N0 to the server H0 are intercepted by the switch 1 and directed to the virtualization proxy controller 5 as shown by a path 14. The virtualization proxy controller 5 also transmits data packets to the I/O device N0, and to the server H0 along the paths 13, 14. It will be appreciated that although only the I/O device N0 and the server H0 are shown in FIG. 2, in practice each of the I/O devices N0, N1 and each of the servers H0, H1, H2 will communicate with the virtualization proxy controller 5 in a similar way to that described above for the I/O device N0 and the server H0.

In one embodiment of the invention, data packets passed between the I/O device N0 and the server H0 are defined with reference to the PCI Express protocol. PCI Express data packets can, for present purposes, be considered to be part of either a control transaction or a data transaction. A transaction may involve a single data packet being passed from an I/O device to a server or vice versa. Alternatively, a transaction may comprise two phases, such that a data packet is sent from an I/O device to a server in a first phase, and a reply is sent from the server to the device in a second phase. It will be appreciated that the directions of the first and second phases will vary depending upon the exact nature of the transaction. Data packets associated with control transactions are routed by the switch 1 to the virtualization proxy controller 5 (i.e. are routed along the paths 13, 14). Data packets associated with data transactions are routed directly between the relevant I/O device and the relevant server (i.e. are routed along the path 10).

More specifically, transactions using the PCI Express protocol can generally be classified into one of five classes:
1. Commands sent from a server to an I/O device;
2. Status read commands sent by a server relating to resources of an I/O device;
3. I/O device commands reading command descriptors in server memory;
4. I/O device commands writing status descriptors in server memory; and
5. I/O device commands reading/writing data buffers in server memory.

Transactions classified in classes 1 to 4 of the above list are considered to be control transactions, and data packets of such transactions are redirected to the virtualization proxy controller 5 by the switch 1 as indicated above. Transactions classified in class 5 are considered to be data transactions and data packets of such transactions are not redirected to the virtualization proxy controller 5. It can be noted that data packets associated with data transactions make up the vast majority (approximately 90%) of data packets passed between servers and I/O devices.

It can therefore be seen that the switch 1 is configured to monitor the type of transaction with which a particular data packet is associated, and to forward the particular data packet to the virtualization proxy controller 5 if it is associated with a predetermined class of transactions. This processing means that all data packets associated with particular types of transactions are redirected to the virtualization proxy controller 5 regardless of a destination specified within the data packets.

Data packets belonging to classes 1 and 2 above can be readily identified by unique fields in headers of those data packets. It is however less easy to distinguish between data packets, received from an I/O device, in class 5 (which are to be forwarded directly to a server), and those in classes 3 and 4 (which are to be forwarded to the virtualization proxy controller 5). Data packets of transactions in class 5 relate to accesses to data buffers, while data packets of transactions in classes 3 and 4 relate to accesses to descriptors. It is desirable that an address included in a received data packet can be used to determine whether the data packet relates to access to a data buffer or a descriptor. It will be appreciated, however, that because descriptors and data buffers are not stored contiguously in the memory 2 of the servers, the switch cannot use the addresses of data buffers and descriptors in the memory 2 of a server to distinguish between the transaction classes of data packets.

Therefore, to enable the switch to distinguish between transactions in class 5 from those in classes 3 and 4, when a server sends a command to an I/O device containing a pointer to the first descriptor, the switch redirects this command to the virtualization proxy controller. The virtualization proxy controller 5 creates copies of the servers' descriptors in local memory 8. The virtualization proxy controller 5 presents the I/O devices with a virtualized view of the location of the descriptors and data buffers by modifying the pointers in the local copies of the descriptors such that the descriptors appear to be stored in a first, contiguous area of memory, while data buffers appear to be stored in a second, contiguous area of memory. The data buffer area is further segmented in the virtualized view, such that the data buffers of a particular server appear to be stored in a contiguous area of memory. The virtualization proxy controller then sends a modified version of the command to the I/O device, pointing to the modified descriptors. The I/O device therefore uses the modified pointers to address descriptors and data buffers in a server memory 2.

The switch 1 can then differentiate between data packets from an I/O device which are in transaction class 5 from those in transaction classes 3 and 4 by examining the memory address specified in the data packet. If it is determined that the address falls into the first contiguous area of memory, the switch redirects the data packet to the virtualization proxy controller. If the address falls into the second contiguous area of memory, the data packet is forwarded directly to the switch.

As an example, the pointers to descriptors may be mapped to a part of the memory having relatively high addresses (e.g. by setting the most significant bit is set), while pointers to data buffers may be mapped to a part of the memory having relatively low addresses (e.g. addresses in which the most significant bit is not set). In this case, the switch can examine the most significant bit of a descriptor address, and thereby determine the nature of the pointer, which will in turn determine the nature of the transaction. Other high-order address bits may be used to associate the data buffer pointers with particular servers, such that the switch 1 can examine those address bits to determine to which server a particular data packet should be forwarded, clearing the high-order address bits before forwarding the data packets to the server.

A method of copying descriptors to the local memory 8 is described in further detail in co-pending UK Patent Application No. 0723939.5, the contents of which are incorporated herein by reference.

Commands sent from a server H0, H1, H2 to an I/O device N0, N1 setting up direct memory access by the I/O devices to the memory of one of the servers H0, H1, H2 are intercepted by the virtualization proxy controller 5 (as such commands fall in transaction class 1 above). Commands setting up direct memory access include data indicating the location of descriptors in a server's memory 2, such descriptors indicating where data for various data packets is stored or is to be stored in the data buffer area 3 of the server memory. The virtualization proxy controller 5 is able to use data included within the commands to access and make a mutable copy of those descriptors in a memory 8 local to the virtualization proxy controller 5 in the manner described above.

Using the local copies of the descriptors, the virtualization proxy controller 5 is able to locate the headers of data packets stored in the data buffer area 3 of the memory 2 provided by one of the servers. The virtualization proxy controller 5 is therefore able to make accesses to the data buffer area 3 of the memory 2 of one of the servers H0, H1, H2 and access or modify data packets stored in the relevant data buffer area 3 before those data packets are read by an I/O device N0, N1 using DMA or after a data packet is written by an I/O device N0, N1 using DMA but before a server H0, H1, H2 is notified that the data packet has been written to the memory 2 of that server. Arrangements which make use of such modification are now described.

One application the present invention relates to the virtualisation of networking I/O devices, such as network interface cards (NICs). That is, the I/O devices N0, N1 of FIG. 1 may be Ethernet NICs, each providing connectivity to at least one network external to the arrangement of FIG. 1. Data packets to be sent to an external network are transferred from a server H0, H1, H2 to an NIC N0, N1 via the switch 1, for forwarding by that NIC. NICs are generally identified by a unique physical address, that is, an address uniquely identifying a particular NIC. NICs adapted to use the IEEE 802.3 (Ethernet) protocol have a physical address known as a Medium Access control (MAC) address.

Where an NIC is connected to an external network using the Ethernet protocol, a server H0, H1, H2 sends PCI Express encapsulated Ethernet data packets (as the switch 1 is a PCI Express switch) to an NIC N0, N1 for forwarding via an Ethernet connection provided by that NIC.

Figure 3:
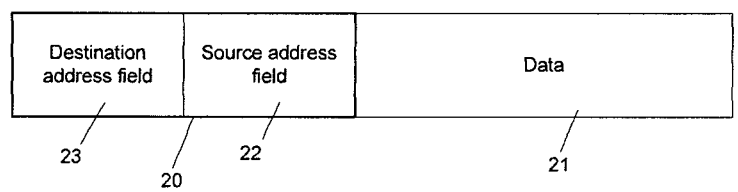
FIG. 3 is a schematic illustration of an Ethernet data packet.

FIG. 3 is a high level schematic illustration of an Ethernet data packet (also known as a frame in the context of Ethernet). Referring to FIG. 3, each Ethernet data packet comprises a header portion 20 and a data portion 21. The header portion 20 comprises a source address field 22 and a destination address field 23. Data packets sent to, for example the NIC 1 (from another NIC via an Ethernet network) contain the MAC address of the NIC 1 in the destination address field 23, while data packets sent from the NIC 1 (over an Ethernet network) contain the MAC address of the NIC 1 in the source address field 22 of the header portion 20.

In embodiments of the present invention, the servers H0, H1, H2 do not reference individual NICs N0, N1 directly. Instead, each server H0, H1, H2 is given access to one or more logical resources each addressed by a virtual MAC address, each logical resource being provided by one or more of the NICs N0, N1. It will be appreciated that to enable such an arrangement data is stored associating virtual MAC addresses used by the servers H0, H1, H2 with physical MAC addresses associated with particular NICs.

The stored data associating virtual and physical MAC addresses is used to translate between the virtual MAC address of a logical resource and the physical MAC address belonging to a particular NIC N0, N1 which makes up that logical resource. The stored data takes the form of an address mapping table. The address mapping table may be stored in the memory 8 local to the virtualization proxy controller 5, or may be stored in memory external to the virtualization proxy controller 5 to which the virtualization proxy controller 5 has access. The mapping table can by defined by an administrator using the management server 11. Data input to the management server 11 indicates the relationship between virtual and physical MAC addresses, and this data is passed to the microcontroller 10 to define the mapping table 9 used by the virtualization proxy controller 5.

Table 1 illustrates an example of an address mapping table maintained by the virtualization proxy controller 5. In the example shown in Table 1, the servers H0, H1, H2 share the resources of two NICs N0 and N1. It will be appreciated that while shown as a single table, the virtualization proxy controller 5 may maintain a plurality of tables, for example the virtualization proxy controller 5 may maintain a separate table for each server H0, H1, H2.

The mapping table is indexed by a logical I/O resource identifier for each logical I/O resource. For each logical I/O resource identifier there is an entry for the server having access to that logical resource, a virtual MAC address used to address that logical resource, entries indicating the physical MAC address of each I/O device (i.e. the I/O devices N0 and N1) along with an entry containing a flag indicating whether a mapping between the virtual MAC address and the physical MAC address of a particular one of the I/O devices N0, N1 is valid for that for that logical resource.

Referring to Table 1, the server H0 has access to a virtual I/O resource R0 addressed by a virtual MAC address of 01-23-45-67-89-00. The virtual MAC address 01-23-45-67-89-00 maps to the physical MAC address of the I/O device N1 (indicated by a valid flag field value of '1'), but not to the physical MAC address of the I/O device N0 (indicated by a valid flag field value of '0'). Given that the virtual I/O resource R0 is provided by a single one of the I/O devices (the device N1), the described arrangement allows for failover in the event that the I/O device N1 fails.

That is, in the event of failure of the I/O device N1, the mapping table can be updated to set the valid flag field of the I/O device N1 to '0' and to set the valid flag field of the I/O device N0 to '1'. No change to the virtual MAC address is required, thereby allowing the server H0 to continue to access the logical I/O resource R0 unaware of the change of physical device providing the logical I/O resource R0. It will be appreciated that in order to effect a smooth transition, it is preferable that the I/O devices N0, N1 are of an equivalent type.

Referring again to Table 1, the server H1 has access to an I/O resource R1 addressed with the virtual MAC address 01-23-45-67-89-01, which maps to the physical MAC address of the I/O device N1, but not the physical MAC address of the I/O device N0, as indicated by values of the valid flags fields.

The server H2 has access to a virtual I/O resource R2 addressed by the virtual MAC address of 01-23-45-67-89-02, which maps to the physical MAC address of both the I/O devices N0 and N1. A possible application of combining the I/O devices N0, N1 into a single virtual I/O resource R1 is aggregation of bandwidth. That is, from the point of view of the server H2, the I/O resource R2 is a single high bandwidth device, while physically, the I/O resource R2 is provided by two distinct I/O devices N0 and N1.

A further example of an application of the mapping described above with reference to Table 1 is performance-based allocation of physical I/O devices. That is, the I/O devices N0, N1 may be dynamically allocated to the servers H0, H1, H2 based upon each server's current requirements and the availability of bandwidth in each I/O device N0, N1. For example, if the server H2 experiences reduced bandwidth requirements while the server H1 requires additional

TABLE 1

| Logical I/O resource | Server | Virtual MAC | I/O device N0 | | I/O device N1 | |
|---|---|---|---|---|---|---|
| | | | Physical MAC | Valid flag | Physical MAC | Valid flag |
| R0 | H0 | 01-23-45-67-89-00 | AB-CD-EF-01-23-45 | 0 | FE-DC-BA-98-76-54 | 1 |
| R1 | H1 | 01-23-45-67-89-01 | AB-CD-EF-01-23-45 | 0 | FE-DC-BA-98-76-54 | 1 |
| R2 | H2 | 01-23-45-67-89-02 | AB-CD-EF-01-23-45 | 1 | FE-DC-BA-98-76-54 | 1 | bandwidth, the I/O device N0 may be dynamically allocated to the I/O resource R1, thereby providing the server H2 with additional bandwidth.

The preceding description has explained how physical MAC addresses can be mapped to virtual MAC addresses, and how such mapping can be useful in providing servers with flexible access to I/O devices. However, it will be appreciated that data stored in the data buffer area 3 of the memory 2 by a server will include references to particular I/O devices in the form of virtual MAC addresses as used by the server.

Where the data buffer area 3 of the memory 2 is accessed directly by an I/O device using DMA, it will be appreciated that this is problematic because the data buffer area 3 will not include the physical MAC address which can be recognised and processed by the I/O device. Similarly, data stored in the data buffer area 3 by an I/O device will include references to particular I/O devices in the form of physical MAC addresses used by the I/O devices, and said physical MAC addresses will not be properly understood by the servers.

As described above, by making local copies of the descriptors provided by the servers H0, H1, the virtualization proxy controller 5 is able to make accesses to the data buffer area 3 of the memory of each of the servers H0, H1, H2 and to modify data packets stored in the data buffer area 3 before those data packets are read by an I/O device N0, N1 or after a data packet is received from an I/O device N0, N1 but before the server H0, H1, H2 is notified of receipt of those data packets. Such access and modification can be used to modify the contents of the data buffer area 3 such that references to virtual MAC addresses are replaced with references to physical MAC addresses as used by an I/O device before data packets are read by an I/O device. Similarly such modification can be used to modify the contents of the data buffer area 3 such that references to physical MAC addresses are replaced with references to virtual MAC addresses before data packets are read by the server.

For example, in the case of NIC virtualization, the virtualization proxy controller 5 may modify source address field 22 of data packets created by a server H0, H1, H2. Data packets created by one of the servers will indicate a source Ethernet address based upon the virtual MAC address used by the server to reference the NIC which is to transmit the data packet. This virtual MAC address is modified and replaced by the physical MAC address associated with the relevant I/O device as included in the mapping table 9. Similarly, where a data packet is written to the data buffer area 3 by one of the I/O devices, the destination Ethernet address will be the physical MAC address associated with the NIC which processed the data packet and wrote the data packet to the data buffer area 3. In this case, the destination address field 23 is modified to replace the physical MAC address of the I/O device at which the data packet was received with the virtual MAC address defined by the mapping table 9 which indicates the virtual address used by the relevant server to reference the relevant NIC. In this way, a server H0, H1, H2 only sees the virtual MAC address of the logical resource assigned to that server.

Figure 4:
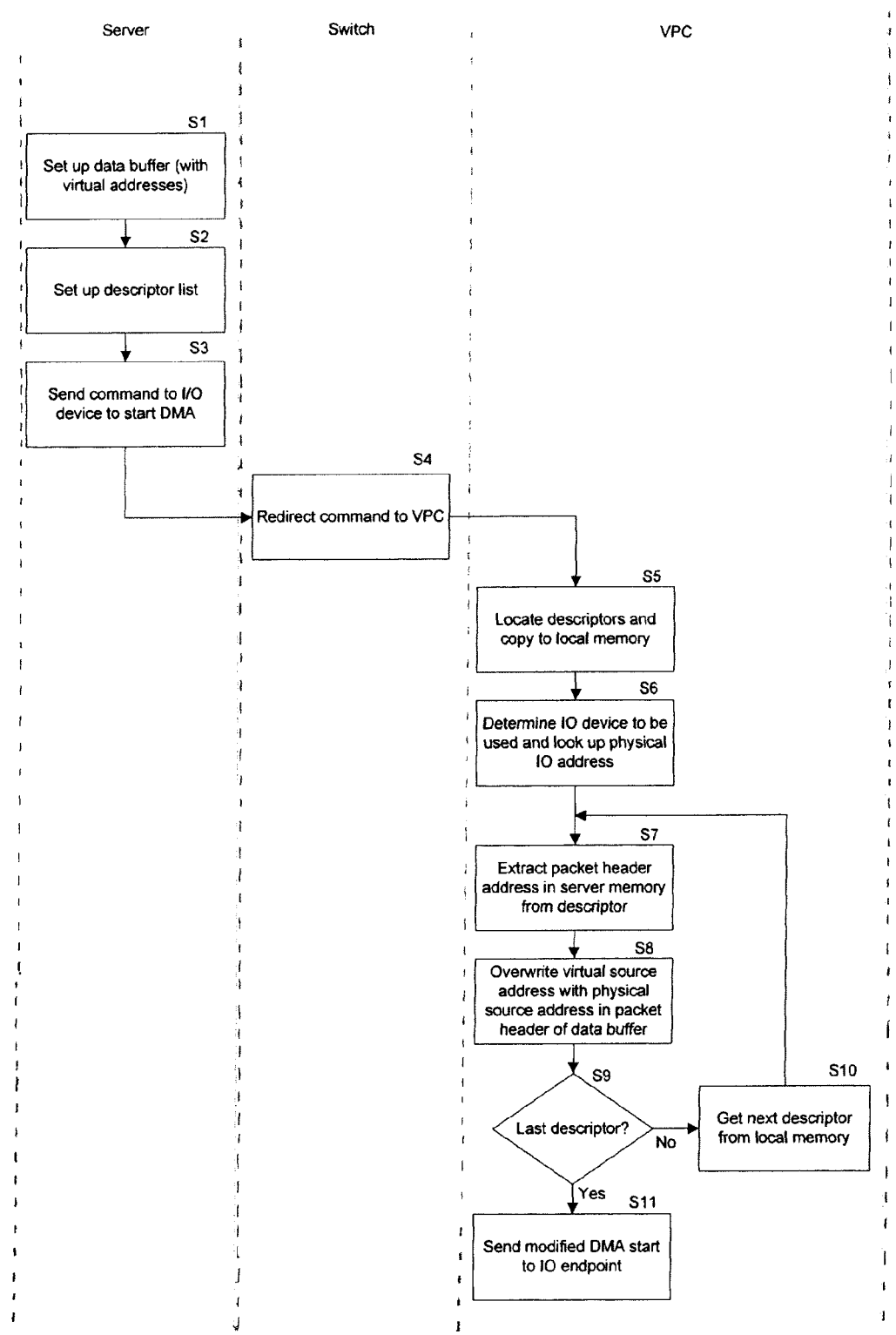
FIG. 4 is a flowchart showing processing carried out to transfer data between a server and an I/O device in the arrangement of FIG. 1 in accordance with an embodiment of the invention.

FIG. 4 illustrates the process of setting up a DMA transfer between a server and an I/O device according to embodiments of the present invention, in which a data packet to be provided to an I/O device is written to the data buffer area 3 from where it is accessed by the relevant I/O device. FIG. 4 is described below with reference to the server H0, the I/O device N1 of FIG. 1 (which the server H0 sees as a (virtual) I/O device R0) and the mapping shown in Table 1.

Referring to FIG. 4, at step S1 the server H0 writes each data packet to be transmitted to the data buffer area 3 of the memory 2 of the server H0. Each data packet includes the virtual MAC address '01-23-45-67-89-00' of the logical I/O resource R0 in the source address field 22 of the encapsulated Ethernet data packet.

At step S2, the server H0 sets up a descriptor for each data packet written to the data buffer area 3 at step S1 in the descriptor area 4. At step S3, the server H0 transmits a data packet comprising a DMA start command via the switch 1 to the I/O device R0 to initiate direct memory access to the data buffer area 3 for transfer from the memory 2 to the I/O device R0. The DMA start command contains the locations of the descriptors created at step S2 in the memory 2 of the server H0.

At step S4, the switch 1 redirects the data packet comprising the DMA start command received from the server H0 at step S3 to the virtualization proxy controller 5. This redirection is carried out because the data packet including the DMA start command is a control data packet which is redirected to the virtualization proxy controller for the reasons set out above.

At step S5 the virtualization proxy controller 5 uses the descriptor pointers contained in the DMA start command to locate the descriptors created at step S2 in the memory 2 of the server H0. The virtualization proxy controller 5 then copies those descriptors to the memory 8 local to the virtualization proxy controller 5 in the manner described above.

At step S6 the virtualization proxy controller 5 determines the I/O device to be used for this transfer using the mapping table 9 and determines the physical MAC address of the I/O device associated with the relevant logical I/O resource. In this example, the I/O device to be used is the I/O device N1 having the physical MAC address 'FE-DC-BA-98-76-54'.

At step S7 the virtualization proxy controller 5 accesses the memory 2 of the server H0, and locates the first data packet indicated by the relevant descriptors in the data buffer area 3. The source address of the relevant data packet is then accessed. At step S8 the virtualization proxy controller 5 overwrites the accessed source address (which initially contains a virtual MAC address '01-23-45-67-89-00') with a physical MAC address 'FE-DC-BA-98-76-54' of the I/O device N1.

At step S9 it is determined whether the descriptor last examined is the last descriptor (i.e. it is determined whether there are further data packets indicated by the descriptors copied in response to the DMA start command). If it is determined that there are further descriptors for data packets in this transfer, processing passes to step S10. At step S10 a next descriptor is retrieved from the memory 8. From step S10 processing passes back to step S7 and continues as described above.

If, on the other hand, it is determined that there are no more descriptors for this transfer, processing passes to step S11 where the virtualization proxy controller 5 sends a DMA command to the I/O device N1, identifying the descriptors stored in the memory 8, thus initiating direct memory access to the memory 2 of the server H0 for transfer from the server H0 to the I/O device N1.

In this way, when the I/O device N1 begins the DMA and accesses the data packets in the memory 2 of the server H0, the source address field 22 of those data packets correctly identifies the I/O device N1 by its physical MAC address, not by the virtual address used by the server H0.

Figure 5:
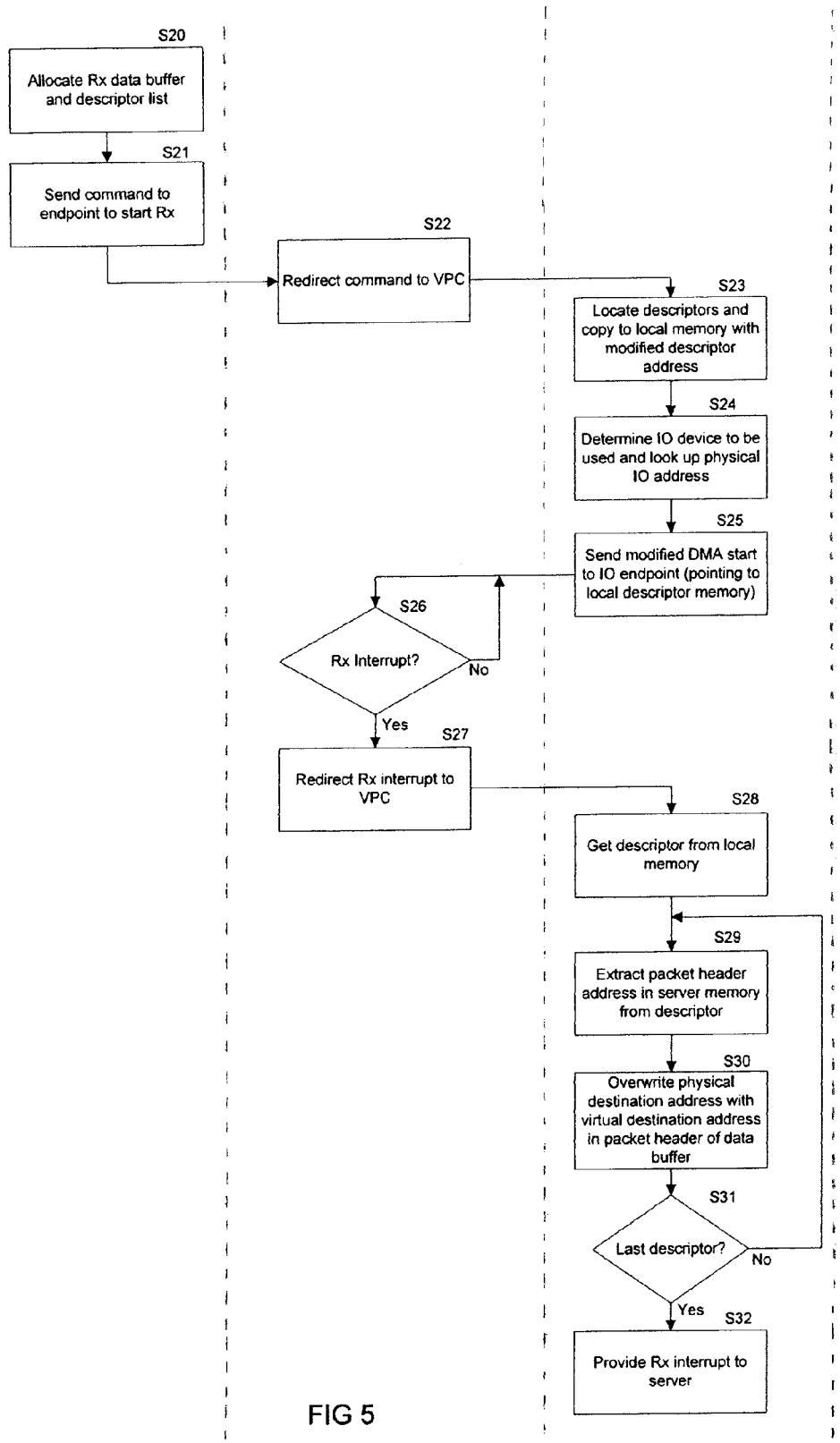
FIG. 5 is a flowchart showing processing carried out to transfer data between an I/O device and a server in the arrangement of FIG. 1 in accordance with an embodiment of the invention.

FIG. 5 illustrates the process of the server H0 receiving data packets from the I/O device N1.

Referring to FIG. 5, at step S20 the server H0 allocates space in the data buffer area 3 and the descriptor area 4 of the memory 2 to store data packets to be received from (as far as the server is concerned) the I/O device R0. At step S21 the server H0 sends a data packet comprising a command via the switch 1 addressed to the I/O device R0 to begin the transfer, the command identifying the relevant descriptors, and inviting the I/O device to write data to the allocated parts of the memory 2.

At step S22 the switch 1 intercepts the data packet comprising the command sent by the server H0 at step S21 and redirects the command to the virtualization proxy controller 5. This happens because the command is part of a control (as opposed to data) transaction, and as set out above, data packets associated with control transactions are redirected to the virtualization proxy controller 5 by the switch 1.

At step S23 the virtualization proxy controller 5 locates the descriptors created at step S20 and copies those descriptors to the local memory 8 of the switch 1 in the manner described above. These descriptors will be modified as data packets are written to the data buffer area 3 by the relevant I/O device.

At step S24 the virtualization proxy controller 5 determines the I/O device from which the server H0 is to receive data by determining a physical MAC address which is associated with the virtual MAC address provided by the server H0 in the intercepted command.

At step S25 the virtualization proxy controller 5 sends a modified DMA start command to the I/O device N1 via the switch 1, the modified DMA start command pointing to the descriptors in the local memory 8 rather than the memory 2 of the server H0, and also referencing the I/O device N1 using its physical MAC address rather than the virtual MAC address used by the server H0.

At step S26 it is determined whether the switch 1 has received an interrupt from the I/O device N1 indicating that data has been written directly to the data buffer area 3 of the memory 2 of the server H0 by the relevant I/O device. If such an interrupt has been received, descriptors in the memory 8 local to the virtualization proxy controller 5 will have been correspondingly updated. If it is determined that an interrupt has not been received, processing passes back to step S26 and a loop is formed until an Interrupt is received. If, on the other hand, it is determined at step S26 that an Interrupt has been received, processing passes to step S27. At step S27 the switch 1 redirects the interrupt to the virtualization proxy controller 5, given that an interrupt is part of a control transaction which is therefore directed to the virtualization proxy controller 5 as described above.

At step S28 the virtualization proxy controller 5 obtains descriptors from the local memory 8. At step S29 the virtualization proxy controller 5 extracts a data packet header address (the address pointing to a location in the data buffer area 3 of the memory 2 of the server H0) from a first descriptor obtained at step S28. At step S30 the virtualization proxy controller 5 overwrites the destination address field of that data packet with the virtual MAC address '01-23-45-67-89-00', thus replacing the physical MAC address included in the data packet as written to the data buffer area 3 by the I/O device N1. At step S31 it is determined if there are any further descriptors for data packets in this transfer. If it is determined that there are further descriptors for data packets in this transfer, processing passes back to step S29. If, on the other hand, it is determined that there are no further descriptors, processing passes to step S32 where the server H0 is notified that data has been received by the provision of an interrupt from the virtualization proxy controller 5 to the server H0.

Following the processing shown in FIG. 5, the destination fields of data packets received at the server H0 are modified to identify the virtual I/O device R0 before the server H0 is notified of receipt of the data packets. In this way, the server H0 need not be aware of the physical address of the I/O device at which those data packets were actually received.

It will be appreciated that the format of the data packets stored in the data buffer area 3 is generally of a proprietary nature. The fields of the stored data packets (e.g. source address fields and destination address fields) may vary in size and position according to the particular proprietary format and the data packet protocol of the data packets stored in the data buffer area, and as such it may be necessary to vary the offset within a data packet stored in the data buffer area 3 at which modification is carried out. In some cases, the field being updated may be included within a checksum and in such cases the checksum may also need to be updated which may require other fields to be read. In other cases the I/O device may perform checksum calculations and checking such that the field will not be protected by a checksum in a server's data buffer area 3.

It will further be appreciated that each server H0, H1, H2 may employ I/O memory management functions in an I/O memory management unit (IOMMU) to protect the memory 2 of that server from being accessed by I/O devices without specific permission to do so. Such IOMMU functions could potentially inhibit the virtualization proxy controller 5 from accessing the memory 2 of the servers H0, H1, H2. In such cases it will be necessary to ensure that the virtualization proxy controller 5 is able to access the sever memory 2. One method of doing so is described in U.S. Patent Application No. 61/048,314 the contents of which are herein incorporated by reference.

Briefly, U.S. Patent Application No. 61/048,314 proposes a method that involves modifying a 'requester identifier' field in the header of request data packets sent to a server from the virtualisation proxy controller such that a request data packet appears, to the server's IOMMU, to have originated from an I/O device having permission to access the relevant part of the server's memory. U.S. Patent Application No. 61/048,314 further proposes modifying unused bits in a tag field of request data packets, generated by the virtualization proxy controller, to identify the virtualization proxy controller. A server then incorporates the modified tag field of the request data packet in completion data packets corresponding to the request data packets, the completion data packets being addressed to the I/O device from which the server believes the request data packet to have originated. The modified tag field allows the switch to identify and intercept data packets generated at a server in response to a request originating from the virtualization proxy controller and to redirect those data packets to the virtualization proxy controller. In this way the server functions as if the relevant request was received from an I/O device which is authorised to access the relevant part of the memory, while the switch and visualization proxy controller allow requests to be made by the virtualization proxy controller and ensure that responses are directed to the virtualization proxy controller.

It will be further appreciated that while some of the described examples are concerned with modifying source and destination MAC addresses within Ethernet data packets, the invention could equally be used to modify fields in data packets which use other protocols. For example, the invention may also be used to modify source and destination IP addresses, and indeed is not limited to the modification of address fields, but instead is widely applicable to the modification of any data as needed to provide virtualization.

It will further be appreciated that while the examples described with reference to FIGS. 4 and 5 are concerned with a method of providing virtualisation of network interface cards by modifying source and destination addresses, the present invention allows modification or inspection in a server's data buffer of any field of data packets stored within that data buffer. For example, the methods described herein can be used to access and modify a single broadcast data packet so as to create a plurality of unicast data packets.

Further, while it is the case that embodiments of the present invention have been described with reference to PCI Express, the present invention could equally be applied to other communications technologies such as Infinband, RapidIO or Hypertransport.

The preceding description has described embodiments of the invention where data packets are transmitted to a plurality of different servers. It will be appreciated that the term server is intended broadly and is intended to cover any computing device. While the described embodiments are based upon three servers communicating with two I/O devices, it will be appreciated that in many embodiments a larger number of servers and/or I/O devices will communicate with one another.

Various modifications and applications of the present invention will be readily apparent to the appropriately skilled person from the teaching herein, without departing form the scope of the appended claims.

The invention claimed is:

1. A method of providing direct access to first data stored at a first device to a second device, the first device storing the first data in a memory of the first device directly accessible to said second device, the method comprising,
   at a control element external to each of said first and second devices, modifying the stored first data in said memory directly accessible to said second device; and
   by said second device and without the control element, directly accessing the modified stored first data in said memory directly accessible to said second device.

2. A method according to claim 1, further comprising, at the control element:
   receiving a message from said first device and accessing and modifying the stored first data in response to receipt of said message.

3. A method according to claim 2, wherein said message is a command intended to initiate access by said second device to said memory directly accessible to said second device.

4. A method according to claim 2, wherein said message is directed from said first device to said second device and redirected to said control element at a switching device.

5. A method according to claim 4, wherein said message is contained within a data packet and the method further comprises:
   determining at the switching device whether a received data packet satisfies a predetermined criterion, and forwarding said data packet to said control element if but only if it is determined that the data packet satisfies the predetermined criterion.

6. A method according to claim 5, wherein said predetermined criterion is based upon a type of transaction with which said data packet is associated.

7. A method according to claim 5, wherein said predetermined criterion is that said data packet comprises a command.

8. A method according to claim 5, further comprising:
   if it is determined that said data packet does not satisfy the predetermined criterion, forwarding said data packet from said switching device to an attached device.

9. A method according to claim 2, wherein said message comprises data indicating said stored first data to be accessed and modified.

10. A method according to claim 9, wherein said data indicating said stored data to be accessed and modified comprises data indicating further data stored at said first device, said further data indicating said stored first data to be accessed and modified.

11. A method according to claim 10, further comprising copying said further data to a memory accessible by said control element.

12. A method according to claim 1, wherein said stored first data comprises data defined with reference to said first device, and said modifying modifies said data defined with reference to said first device to be defined with reference to said second device.

13. A method according to claim 12, wherein the data defined with reference to said first device comprises an identifier used by said first device to reference said second device.

14. A method according to claim 12, wherein the data defined with reference to said first device is a logical identifier of said second device.

15. A method according to claim 12, wherein modifying the data defined with reference to said first device so as to be defined with reference to said second device comprises modifying said data to indicate a physical identifier of said second device.

16. A method according to claim 12, further comprising:
   reading said data defined with reference to said first device;
   determining corresponding data defined with reference to said second device; and
   modifying said data defined with reference to said first device based upon said corresponding data.

17. A method according to claim 16, further comprising:
   storing data in a memory accessible to said control element defining relationships between said data defined with reference to said first device and said data defined with reference to said second device.

18. A method according to claim 1, wherein said stored first data comprises a plurality of data packets.

19. A method according to claim 18, wherein said modifying comprises modifying a field in a header of at least one of said plurality of data packets.

20. A method according to claim 18, wherein said modifying comprising modifying a part of at least one of said plurality of data packets defined by an offset relative to a start of the data packet.

21. A method according to claim 1, further comprising, at the second device, reading data from said memory directly accessible to said second device after said modification.

22. A method according to claim 1, wherein the first device is a computing device, the memory directly accessible to said second device is a memory of the computing device and the second device accesses the memory of the computing device using direct memory access.

23. A computer program comprising computer readable instructions arranged to cause a computer to carry out a method according to claim 1.

24. A non-transitory computer readable medium carrying a computer program according to claim 23.

25. A control element comprising:
a memory storing processor readable instructions; and
a processor arranged to read and execute instructions stored in said program memory;
wherein said processor readable instructions comprise instructions arranged to cause the processor to carry out a method according to claim 1.

26. The control element according to claim 25 in communication with a switching device, wherein the switching device comprises:
a first interface for communication with said first device;
a second interface for communication with said second device;
a third interface for communication with said control element; and
a processor arranged to process data packets passing between said first device and said second device, and to forward a processed data packet to said control element if but only if a predetermined criterion defined with reference to the processed data packets is satisfied.

27. A method of storing data in a memory of a first device, said memory being directly accessible to a second device, and said data being directly received from said second device, the method comprising, at a control element external to each of said first and second devices:
modifying said data in said memory directly accessible to said second device before said data is processed by said first device, wherein said first device processes said data without the control element.

28. A method according to claim 27, further comprising, at the control element:
receiving a message from said second device and accessing and modifying said data in response to receipt of said message.

29. A method according to claim 28, wherein said message is an interrupt indicating that said data has been written to said memory by said second device.

30. A method according to claim 28, wherein said message is directed from said first device to said second device and redirected to said control element at a switching device.

31. A method according to claim 30, wherein said message is contained within a data packet and the method further comprises:
determining at the switching device whether a received data packet satisfies a predetermined criterion, and forwarding said data packet to said control element if but only if it is determined that the data packet satisfies the predetermined criterion.

32. A method according to claim 31, wherein said predetermined criterion is based upon a type of transaction with which said data packet is associated.

33. A method according to claim 31, wherein said predetermined criterion is that said data packet comprises a command.

34. A method according to claim 27, further comprising, at the control element:
receiving an initiation message, said initiation message being generated by said first device and indicating a part of said memory directly accessible to said second device to which data is to be written by said second device.

35. A method according to claim 34, wherein said data indicating a part of said memory directly accessible to said second device to which data is to be written indicates further data stored at said first device, said further data indicating said part of said memory directly accessible to said second device to which data is to be written.

36. A method according to claim 35, further comprising copying said further data to a memory accessible by said control element.

37. A method according to claim 27, wherein said second device writes data defined with reference to said second device, and said modifying modifies said data defined with reference to said second device to be defined with reference to said first device.

38. A method according to claim 37, wherein the data defined with reference to said first device comprises an identifier used by said first device to reference said second device.

39. A method according to claim 37, wherein the data defined with reference to said first device is a logical identifier of said second device.

40. A method according to claim 37, wherein modifying the data defined with reference to said second device so as to be defined with reference to said first device comprises modifying said data to indicate a logical identifier of said second device.

41. A method according to claim 27, further comprising:
reading said data defined with reference to said second device;
determining corresponding data defined with reference to said first device;
modifying said data defined with reference to said second device based upon said corresponding data.

42. A method according to claim 41, further comprising:
storing data in a memory accessible to said control element defining relationships between said data defined with reference to said first device and said data defined with reference to said second device.

43. A method according to claim 27, wherein said data stored by said second device comprises a plurality of data packets.

44. A method according to claim 43, wherein said accessing said data further comprises modifying said data in said memory directly accessible to said second device before said data is processed by said first device and said modifying comprises modifying a field in a header of at least one of said plurality of data packets.

45. A method according to claim 43, wherein said accessing said data further comprises modifying said data in said memory directly accessible to said second device before said data is processed by said first device and said modifying comprises modifying a part of at least one of said plurality of data packets defined by an offset relative to a start of the data packet.

46. A method according to claim 27, wherein the first device is a computing device, the memory directly accessible to said second device is a memory of the computing device and the second device accesses the memory of the computing device using direct memory access.

47. A computer program comprising computer readable instructions arranged to cause a computer to carry out a method according to claim 27.

48. A non-transitory computer readable medium carrying a computer program according to claim 47.

49. The control element comprising:
a memory storing processor readable instructions; and
a processor arranged to read and execute instructions stored in said program memory;
wherein said processor readable instructions comprise instructions arranged to cause the processor to carry out a method according to claim 27.

50. The control element according to claim 49 in communication with a switching device, wherein the switching device comprises:
- a first interface for communication with said first device;
- a second interface for communication with said second device;
- a third interface for communication with said control element; and
- a processor arranged to process data packets passing between said first device and said second device, and to forward a processed data packet to said control element if but only if a predetermined criterion defined with reference to the processed data packets is satisfied.

51. An apparatus for storing data in a memory of a first device, said memory being directly accessible to a second device, and said data being directly received from said second device, the apparatus comprising a control element external to each of said first and second devices, the control element further comprising:
- means for modifying said data in said memory directly accessible to said second device before said data is processed by said first device, wherein said first device processes said data without the control element.

52. A method of providing direct access to first data stored at a first device to a second device, the first device storing the first data in a memory of the first device directly accessible to said second device, the method comprising, at a virtualization proxy controller external to each of said first and second devices:
- modifying the stored first data in said memory directly accessible to said second device before said first data is directly accessed in said memory directly accessible to said second device by said second device, wherein said second device directly accesses said first data without the virtualization proxy controller.

53. A method of direct access to first data stored at a first device to a second device, the first device storing the first data in a memory of the first device directly accessible to said second device, the method comprising, at a virtualization proxy controller external to each of said first and second devices:
- modifying the stored first data in said memory directly accessible to said second device before said first data is directly accessed in said memory directly accessible to said second device by said second device, wherein said second device directly accesses said first data without the virtualization proxy controller,
- wherein said first data is a virtual MAC address and modifying the stored first data comprises replacing said virtual MAC address with a physical MAC address of said second device.

* * * * *